(12) United States Patent
Yasunishi et al.

(10) Patent No.: US 7,042,940 B2
(45) Date of Patent: May 9, 2006

(54) DIGITAL VIDEO SIGNAL TRANSMISSION APPARATUS AND IMAGE DISPLAY APPARATUS

(75) Inventors: Norio Yasunishi, Kitakatsuragi-gun (JP); Futoshi Satoh, Oita (JP)

(73) Assignee: Sharp Kabushiki Kaisha, Osaka (JP)

( * ) Notice: Subject to any disclaimer, the term of this patent is extended or adjusted under 35 U.S.C. 154(b) by 1149 days.

(21) Appl. No.: 09/919,697

(22) Filed: Jul. 31, 2001

(65) Prior Publication Data

US 2002/0085113 A1     Jul. 4, 2002

(30) Foreign Application Priority Data

Jul. 31, 2000  (JP)  ............... 2000-232141

(51) Int. Cl.
*H04N 7/12* (2006.01)
(52) U.S. Cl. ................................. 375/240.01
(58) Field of Classification Search ............ None
See application file for complete search history.

(56) References Cited

U.S. PATENT DOCUMENTS

| | | | | |
|---|---|---|---|---|
| 4,738,406 A | * | 4/1988 | Lothamer | 242/480.7 |
| 4,779,144 A | * | 10/1988 | Dischert et al. | 386/31 |
| 4,791,654 A | * | 12/1988 | De Marca et al. | 375/241 |
| 5,202,755 A | * | 4/1993 | Yang et al. | 375/240.01 |
| 5,438,371 A | * | 8/1995 | Gutsmann et al. | 348/492 |
| 5,953,691 A | * | 9/1999 | Mills | 702/198 |
| 6,256,347 B1 | * | 7/2001 | Yu et al. | 375/240.13 |
| 2004/0028129 A1 | * | 2/2004 | Nagumo et al. | 375/240.08 |

FOREIGN PATENT DOCUMENTS

JP         164944        6/1994

\* cited by examiner

*Primary Examiner*—Nhon Diep
(74) *Attorney, Agent, or Firm*—Edwards Angell Palmer & Dodge LLP; David G. Conlin; George W. Hartnell

(57) ABSTRACT

A digital video signal transmission apparatus is provided with (a) a digital video signal conversion circuit for converting each chrominance signal of an input digital video signal in such a manner that every plural frames (1) in one frame of the plural frames each chrominance signal is converted into a signal having plural bits, (2) in the other frames of the plural frames, each chrominance signal is converted into a signal having 1 bit, so that an average of gradation levels of the respective chrominance signals in plural frames after the conversion is substantially equal to gradation levels of the respective chrominance signals in a single frame before conversion, (b) a flag signal generation circuit for generating a flag signal for setting the respective chrominance signals in each pixel signal, so that one of the chrominance signal has plural bits, while the other chrominance signal has one bit, (c) a converted data combination circuit for assigning each signal to each of the chrominance signal in accordance with the flag signal, and (d) a bit expansion circuit for carrying out bit expansion of the digital video signal in accordance with the flag signal, so that each chrominance signal has an identical number of bits in each pixel signal. This provides an image display apparatus that can reduce a data amount of the digital video signal which is transmitted via a data transmission path.

9 Claims, 8 Drawing Sheets

FIG. 4

(FLAG SIGNAL)

[FRAME 1]

|    | X1 | X2 |
|----|----|----|
| Y1 | 10 | 11 |
| Y2 | 01 | 00 |

[FRAME 2]

|    | X1 | X2 |
|----|----|----|
| Y1 | 01 | 10 |
| Y2 | 00 | 11 |

[FRAME 3]

|    | X1 | X2 |
|----|----|----|
| Y1 | 00 | 01 |
| Y2 | 11 | 10 |

[FRAME 4]

|    | X1 | X2 |
|----|----|----|
| Y1 | 11 | 00 |
| Y2 | 10 | 01 |

FIG. 5

(NUMBER OF BITS)

|  | X1 | | | X2 | | |
|---|---|---|---|---|---|---|
| Y1 | 1 | 1 | 4 | 1 | 1 | 4* |
| Y2 | 1 | 4 | 1 | 4 | 1 | 1 |
|  | R | G | B | R | G | B |

[FRAME 1]

|  | X1 | | | X2 | | |
|---|---|---|---|---|---|---|
| Y1 | 1 | 4 | 1 | 1 | 1 | 4 |
| Y2 | 4 | 1 | 1 | 1 | 1 | 4* |
|  | R | G | B | R | G | B |

[FRAME 2]

|  | X1 | | | X2 | | |
|---|---|---|---|---|---|---|
| Y1 | 4 | 1 | 1 | 1 | 4 | 1 |
| Y2 | 1 | 1 | 4* | 1 | 1 | 4 |
|  | R | G | B | R | G | B |

[FRAME 3]

|  | X1 | | | X2 | | |
|---|---|---|---|---|---|---|
| Y1 | 1 | 1 | 4* | 4 | 1 | 1 |
| Y2 | 1 | 1 | 4 | 1 | 4 | 1 |
|  | R | G | B | R | G | B |

[FRAME 4]

(NOTE: THE SIGNAL HAVING 4* BITS IS A BINARY SIGNAL)

FIG. 6

(GRADATION LEVEL)

|     | X1 | | | X2 | | |
|-----|---|---|---|---|---|---|
| Y1 | 0 | 0 | 12/15 | 1 | 0 | 0/15 |
| Y2 | 0 | 12/15 | 1 | 12/15 | 1 | 0 |
|     | R | G | B | R | G | B |

[FRAME 1]

|     | X1 | | | X2 | | |
|-----|---|---|---|---|---|---|
| Y1 | 0 | 12/15 | 1 | 0 | 0 | 12/15 |
| Y2 | 12/15 | 1 | 0 | 1 | 0 | 0/15 |
|     | R | G | B | R | G | B |

[FRAME 2]

|     | X1 | | | X2 | | |
|-----|---|---|---|---|---|---|
| Y1 | 12/15 | 1 | 0 | 0 | 12/15 | 1 |
| Y2 | 1 | 0 | 0/15 | 0 | 0 | 12/15 |
|     | R | G | B | R | G | B |

[FRAME 3]

|     | X1 | | | X2 | | |
|-----|---|---|---|---|---|---|
| Y1 | 1 | 0 | 0/15 | 12/15 | 1 | 0 |
| Y2 | 0 | 0 | 12/15 | 0 | 12/15 | 1 |
|     | R | G | B | R | G | B |

[FRAME 4]

DIGITAL VIDEO SIGNAL TRANSMISSION APPARATUS AND IMAGE DISPLAY APPARATUS

FIELD OF THE INVENTION

The present invention relates to a digital video signal transmission apparatus that transmits, through a data transmission path, a digital video signal in which a plurality of chrominance signals having plural bits per pixel are combined. Particular, the present invention relates to a digital video signal transmission apparatus, which carries out bit compression (data compression) of a digital video signal, so as to use fewer data transmission lines that are necessary for parallel transmission in which a pixel signal (a signal, which expresses information on each pixel, and has plural bits) is divided per bit among a plurality of data transmission lines and transmitted via the data transmission lines per bit. Further, the present invention relate to an image display apparatus incorporated with same. Furthermore, the present invention also relates to a digital video signal compression apparatus and a method of compressing a digital video signal for reducing a number of bits contained in the digital video signal in which chrominance signals having plural bits per pixel are combined.

BACKGROUND OF THE INVENTION

Generally, a digital video signal having a plurality of gradations is expressed in such a manner that gradations of a single pixel are expressed in a plurality of bits. Thus, as a number of the gradations is increased, a sum of bit numbers, that is, a data amount is increased.

Therefore, the digital video signal is compressed in terms of bits so as to decrease the data amount, in case of high-speed serial transmission of data, or when it is necessary to have a smaller data amount to store data in a recording device as an image data.

However, in many cases apart from those special cases, a signal is transmitted in its original form and bit number as it is, without bit compression or data conversion. Particularly, in case of parallel transmission where a digital video signal, which is a signal having a plurality of bits and expresses information of each pixel, is divided per bit among a plurality of data transmission lines and transmitted per bit via the data transmission lines, a signal is, conventionally, transmitted in its original form and bit number, as it is.

However, in case of the parallel transmission in which a signal, contained in the digital video signal, having plural bits and expressing the information of each pixel is divided per bit among the plurality of the data transmission lines and transmitted per bit via the transmission lines, it is necessary to provide one data transmission line for 1 bit. Thus, if the signal is transmitted in its original form and bit number, it requires a great number of data transmission lines when bit number per pixel is large.

The digital video signal is usually composed of signals of three primary colors, namely: a red chrominance signal R, a green chrominance signal G, and blue chrominance signal B (hereinafter, just referred to as R, G, and B, respectively), whereas, in some cases, the digital video signal is composed of a luminance signal and two of color-difference signals. Each of the R, G and B is a gradation signal containing a plurality of bits. Therefore, for example, in case subjected to the parallel transmission between circuits is a digital video signal composed of R, G and B having 4 bits respectively, where the digital video signal is transmitted in its original form and bit number by being divided per bit among a plurality of transmission lines that are allotted for each bit, it is necessary to have twelve data transmission lines in total because one data transmission line is required for transmitting 1 bit.

As discussed above, in the conventional transmission method of the digital video signal, an increase in the bit number per pixel of the digital video signal leads to the increase in the number of the data transmission lines, at the same time.

Therefore, the conventional transmission method of the digital video signal requires a great number of data transmission lines on a substrate or in a circuit, in order to transmit the digital video signal on the substrate, or in the circuit. Such a problem is posed that this may demand a larger substrate or bigger circuit size. Another problem is that the increase in the number of the data transmission lines causes a greater consumption of power in a system (an image display apparatus) which is incorporated with a transmission apparatus and a reception apparatus, while increasing undesirable radiation noise generated by the data transmission lines.

SUMMARY OF THE INVENTION

The present invention is contrived in order to solve the forgoing conventional problems, and has an object to provide a digital video signal transmission apparatus that can reduce a data amount of a digital video signal, which is transmitted via data transmission path, and especially to provide a digital video signal transmission apparatus that can carry out the parallel transmission, in which the digital video signal is divided per bit among a plurality of the data transmission lines and transmitted per bit via the transmission lines, without requiring a larger substrate or a greater circuit size, while cutting the power consumption of the system (the image display apparatus) and reducing the undesirable radiation noise, and to provide an image display apparatus incorporated with same.

To achieve the above object, an digital video signal transmission apparatus of the present invention is provided with (1) a data transmission path for transmitting a digital video signal in which a plurality of chrominance signals having plural bits per pixel are combined, (2) conversion means for converting the respective chrominance signals of the digital video signal to be transmitted, in such a manner that every plural frames (a) in one frame of the plural frames, each of the chrominance signals is converted into a gradation signal having plural bits less or equal to a number of bits contained in each chrominance signal, while (b) in other frames of the plural frames, each of the chrominance signals is converted into a binary signal having 1 bit, so that an average of gradation levels (luminance levels) of the respective chrominance signals in the plural frames after the conversion, which have been prepared by dividing a single frame before conversion into the plural frames in a predetermined number, is substantially equal to a gradation level of the respective chrominance signals in the single frame before the conversion, (3) flag signal generation means (a) for generating a flag signal for setting how the gradation signal and the binary signal are respectively assigned to each of the chrominance signals, which constitute each pixel signal, so that one of the chrominance signals has plural bits, while the other chrominance signals have 1 bit, and (b) for outputting the flag signal to the data transmission path, (4) signal setting means (a) for assigning the gradation signal and the binary signal respectively to each of the chrominance signals, in accordance with the flag signal, so that one of the plural chrominance signals, which constitute each pixel signal, has plural bits, while the other chrominance signals have 1 bit, and (b) for outputting a resultant digital video signal to the data transmission path, and (5) bit expansion means for carrying out bit expansion of the digital video signal, which has been transmitted, in accordance with the flag signal that have been transmitted via the data transmission path, so that the respective plural chrominance signals, which constitute each pixel signal, have an equal number of bits.

When an image of the digital video signal is displayed, human eyes do not perceive a change in gradation levels, but perceive the gradation levels as constant gradation level equal to the average of the gradation levels, with respect to a relatively small number of continuous plural frames. Therefore, with the above arrangement, an image perceived by the human eyes can be displayed with gradations substantially equivalent to gradations of the original digital video signal. Accordingly, the above arrangement can reduce bits of the digital video signal in number without deteriorating the display quality of the digital video signal significantly.

Therefore, with the arrangement, it is possible to decrease the data amount of the digital video signal to be transmitted. Especially, in case of the parallel transmission where the digital video signal is divided per bit among the plurality of the data transmission lines and transmitted per bit via the data transmission lines, the arrangement reduces the data transmission lines in number. As a result, it becomes possible to employ a smaller substrate or a circuit having a smaller circuit size, while reducing the power consumption and the undesirable radiation noises in the image display apparatus.

For example, when the input digital video signal is composed of RGB respectively having 6 bits in the above arrangement, in order that the average of gradation levels in a plurality of frames after the conversion is substantially equal to the gradation level in the single frame before the conversion, it is a minimum requirement to have a number of gradations, which is close to the number of gradations (sixty four) of the respective colors of the input digital video signal, that is, a gradation number of sixty or more. The number of gradations after conversion, which is obtained as an average of gradation levels of frames in an F number, is determined by an equation: $(2^A-1) \times F+1$, where $A$ is a number of bits per pixel of a gradation signal, and F is a number of plural frames (a frame group) in accordance with a frame cycle in which a single chrominance signal is expressed in accordance with a gradation signal having plural bits. Accordingly, in the above example, the equation $(2^A-1) \times F+1$ should be equal to sixty four or more, or close to sixty four.

Moreover, it is generally preferable that the number F of frames is eight or less, because a change in gradations of the frames in an F number may be perceived by human eyes and the display may be consider to be flickering, when the frame number F is excessively large. Furthermore, the flag signal, which is a ternary or quaternary signal, needs 2 bits. Therefore, a number of bits per pixel of the signal to be transmitted through the data transmission path is equal to A+1+1 +2.

Those conditions determine a combination of a number F of frames in the frame group and a number $A$ of bits per pixel of the gradation signal. With the combination, found out is the number of bits per pixel in the signal to be transmitted via the data transmission path. With a combination of conditions (a) A=4 and (b) $4 \leq F \leq 8$, the number of bits per pixel of the signal to be transmitted via the data transmission path is the smallest, that is, 8 bits.

On the contrary, if the conversion is carried out so that the respective chrominance signals have the equal numbers of bits per pixel, when the numbers F of the frames in the frame group and the number A of bits per pixel in accordance with the gradation signal (each chrominance signal) are regarded in the same manner, the number of bits per pixel in the signal to be transmitted is A×3. Thus, the number of bits per pixel will be more than that of the arrangement of the present invention, unless it is arranged that A=2. For example, with a combination of conditions (a) A=4 and (b) $4 \leq F \leq 8$, the number of bits per pixel in the signal to be transmitted via the data transmission path is 12 bits, which is greater than the arrangement of the present invention by 4 bits.

Therefore, with the arrangement of the present invention, it is possible to have much smaller number of bits per pixel in the signal to be transmitted via the data transmission path, compared with the case where the conversion is carried out so that the respective chrominance signals have equal numbers of bits per pixel. In other words, further reduction in the data amount of the digital video signal to be transmitted via the transmission path is possible. Therefore, especially in case of the parallel transmission where the signal having plural bits for expressing the information of each pixel is divided per bit among a plurality of the data transmission lines and transmitted per bit via the transmission lines, the number of the data transmission lines can be reduced more significantly. As a result, it is possible to use a much smaller substrate or to reduce a circuit size. Meanwhile, the power consumption and undesirable radiation noises of the image display apparatus can be further reduced.

Note that, in the present specification, the following denotations are used: Denoted as the wording "a binary signal having plural bits" is a digital signal that has plural bits and takes only two values (for example, a digital signal having 2 bits and takes only two values, "00" and "11"); meant by the wording "a gradation signal having plural bits" is a digital signal that has plural bits and can take any value arbitrarily for expressing the gradations (for example, a digital signal having 2 bits which can take any one of four values, "00", "01", "10", and "11").

Moreover, in order to attain the above object, an image display apparatus of the present invention is provided with a digital video signal transmission apparatus of the present invention.

The above arrangement provides an image display apparatus which can reduce the data amount of the digital video signal to be transmitted via the data transmission path. Especially, when the digital video signal is divided per bit among a plurality of data transmission lines and transmitted per bit via the transmission lines, that is, the digital video signal is transmitted by the parallel transmission, it can employ a small substrate or a circuit of a small size, thereby realizing an image display apparatus that is small in size. Meanwhile, because it is possible to reduce the power consumption and the undesirable radiation noises, realized is an image display apparatus of an energy-saving type having less noises.

A digital video signal compression apparatus of the present invention, which reduces a number of bits of a digital video signal in which a plurality of chrominance signals having plural bits per pixel are combined, is provided with (1) conversion means for converting the respective chrominance signals of the digital video signal, in such a manner that every plural frames (a) in one frame of the frames in a plural number which is less or equal to a number of bits of the respective chrominance signals, each of the chrominance signals is converted into a gradation signal having plural bits less or equal to a number of bits contained in each chrominance signal, while (b) in other frames of the plural frames, each of the chrominance signals is converted into a binary signal having 1 bit, so that the average of gradation levels of the respective chrominance signals in the plural frames after the conversion is substantially equal to the gradation level of the respective chrominance signals in the single frame before the conversion, (b) flag signal generation means for generating a flag signal for setting how the gradation signal and the binary signal are respectively assigned to each of the chrominance signals, which constitute each pixel signal, so that one of the chrominance signals has plural bits, while the other chrominance signals have 1 bit, and (3) signal setting means for assigning the gradation signal and the binary signal respectively to each of the chrominance signals, in accordance with the flag signal, so that one of the plural chrominance signals, which constitute each pixel signal, has plural bits, while the other chrominance signals have 1 bit.

With the arrangement, it is possible to reduce the number of bits contained in the digital video signal, while avoiding significant deterioration in an image quality of the digital video signal. In other words, it is possible to restore the original digital video signal without much damages to its image quality with the arrangement where the bit expansion of the compressed digital video signal is carried out so that each of the plural chrominance signals, which constitute each pixel signal, has an identical number of bits, in accordance with the flag signal.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a view illustrating an example how the flag signal is set with respect to RGB of adjacent four pixels within a four frame period, in accordance with the embodiment of the present invention.

FIG. 5 is a view showing an example how bits are assigned to the RGB of the adjacent four pixels within the four frame period, in accordance with the embodiment of the present invention.

FIG. 6 is a view illustrating an example of gradation levels of the RGB of the adjacent four pixels within the four frame period, in accordance with the embodiment of the present invention.

DESCRIPTION OF THE EMBODIMENTS

Described below is an embodiment of the present invention, referring to FIGS. 1 through 7.

Figure 1:
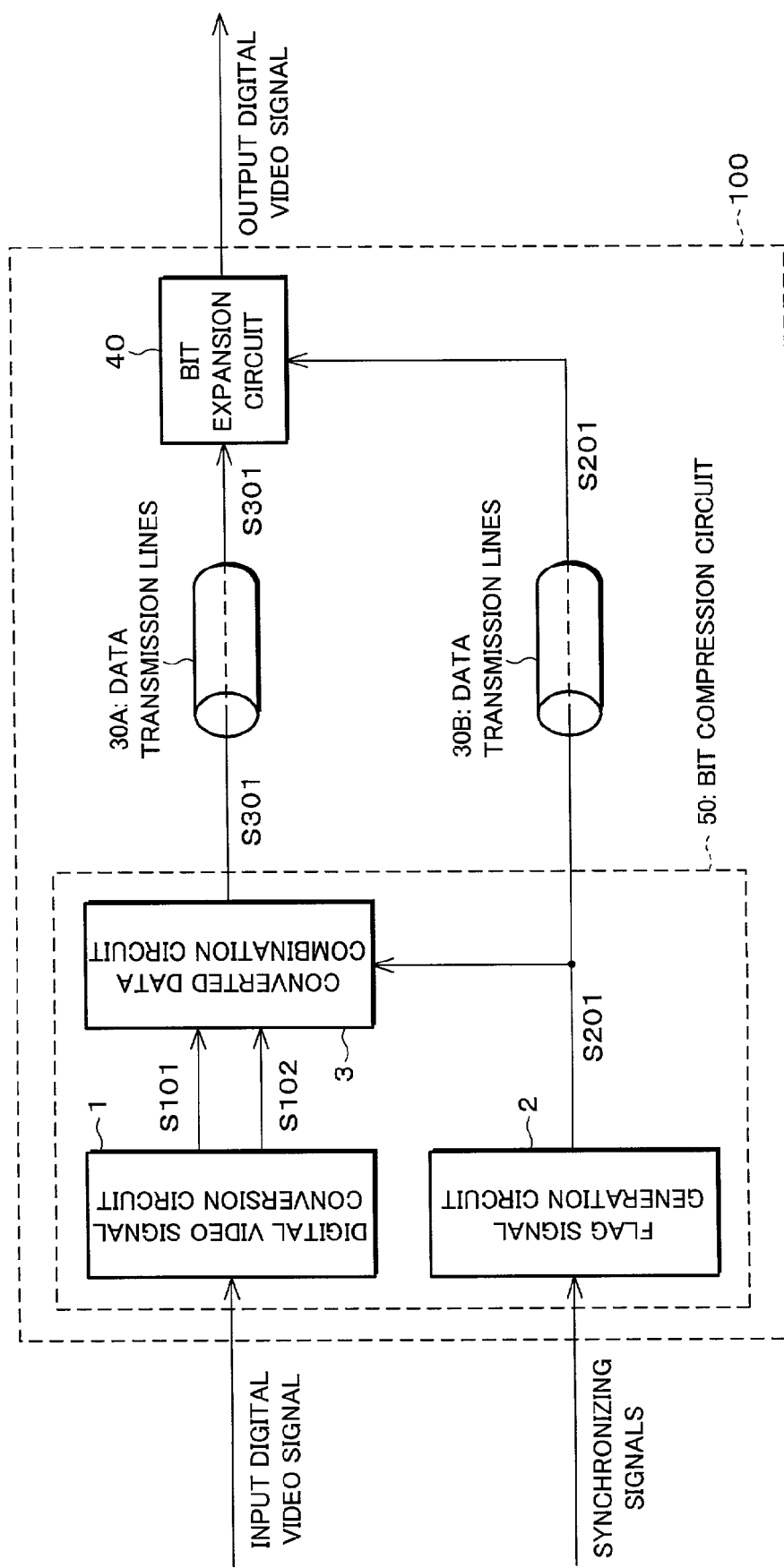
FIG. 1 is a schematic block diagram showing a constitution of a digital video signal transmission apparatus of an embodiment of the present invention.

FIG. 1 shows a schematic block diagram illustrating a digital video signal transmission apparatus of the embodiment of the present invention.

As shown in FIG. 1, a digital video signal transmission apparatus 100 of the present embodiment is provided with a bit compression circuit (digital video signal compression apparatus) 50, a plurality of data transmission lines (data transmission path) 30A, and a bit expansion circuit (bit expansion means) 40. The bit compression circuit 50 carries out bit compression of an input digital video signal. The data transmission lines 30A transmit, as transmission data S301, the digital video signal, which has been subjected to bit compression. The bit expansion circuit 40 performs bit expansion of the transmission data S301, which has been transmitted. Moreover, the bit compression circuit 50 is provided with a digital video signal conversion circuit (conversion means) 1, a flag signal generation circuit (flag signal generation means) 2, and a converted data combination circuit (signal setting means) 3.

The input digital video signal is a digital video signal that is composed of a plurality of chrominance signals (for example, R, G and B). Moreover, the input digital video signal is composed of pixel signals that indicate information of each pixel. A single pixel signal is made of multiple gradation chrominance signals of plural bits. The multiple gradation chrominance signals respectively indicate information of adjacent dots, which make multiple colors and constitute one pixel. The respective chrominance signals have an identical number of bits.

The digital video signal conversion circuit 1 carries out conversion of the respective chrominance signals (the gradation signals having plural bits) of the input digital video signal, so that an average of the gradation levels (the luminance levels) of the respective chrominance signals in plural frames after the conversion is substantially equal to the gradation level of the respective chrominance signals in a single frame before the conversion. (Hereinafter, plural frames after conversion, which have been prepared by dividing a single frame before conversion into the plural frames in a predetermined number, are referred to as a single frame group.) The conversion is carried out in such a manner that in each frame group (a) in one frame, each of the chrominance signals is converted into a gradation signal S101 having plural bits (the number of bits contained in the gradation signal S101 is smaller than the numbers of bits in the respective chrominance signals), while (b) in the other frames of the frame group, each of the chrominance signals is converted into the binary signal having 1 bit (an ON-OFF state signal that takes a value of 0 or a value of 1) S102. Furthermore, the digital video signal conversion circuit 1 outputs the digital video signal, which has been converted, to the converted data combination circuit 3. Note that, the conversion of each of the chrominance signals into the gradation signal S101 having plural bits is carried out every plural frames which is greater in number than types of the chrominance signals.

The flag signal generation circuit 2 generates a flag signal S201 for setting assignment of the gradation signal S101 and the binary signal S102 to each of the chrominance signals, which constitute each pixel signal. The setting of the assignment is done in such a manner that, only one of the chrominance signals has plural bits, and the rest of the chrominance signals have 1 bit. The flag signal generation circuit 2, then, outputs the flag signal S201 to the converted data combination circuit 3 and bit expansion circuit 40. The outputting of the flag signal S201 from the flag generation circuit 2 to the bit expansion circuit 40 is carried out via data transmission lines 30B, which will be explained later. In accordance with a number of patters how the gradation signal S101 and the binary signal S102 are respectively assigned to each of the plural chrominance signals that constitute each pixel signal, set is how many bits each flag signal S201 has. For example, if each pixel signal is composed of three chrominance signals, there are at least three kinds of patters how the gradation signal S101 and the binary signal S102 are respectively assigned to each of the chrominance signals. Accordingly, each flag signal S201 is set to have 2 bits.

The converted data combination circuit 3 assigns the gradation signal S101 and the binary signal S102 respectively to each of the chrominance signals, in accordance with the flag signal S201, so that only one of the chrominance signals, which constitute each pixel signal of the input digital video signal, have plural bits, while the other chrominance signals have 1 bit. The converted data combination circuit 3 outputs a resultant digital video signal as transmission data S301 to the data transmission lines 30A.

The following is an example how the gradation signal S101 and the binary signal S102 are assigned in case where n is a number of types of the chrominance signals, and the n number of the types of the chrominance signals is equal to a number of frames in a frame group. In short, where a single pixel signal is composed of the n number of different types of chrominance signals (a first chrominance signal, a second chrominance signal, to an n-th chrominance signal), there are a plurality of frames, which are equal in number to the number of the frames in the frame group. It is arranged that, among the frames, in the first frame, only the first chrominance signal becomes the gradation signal S101 having plural bits (each of the others becomes the binary signal S102 having 1 bit), while only a second chrominance signal becomes the gradation signal S101 having plural bits (each of the others becomes the binary signal S102 having 1 bit) in the next frame. In the arrangement, only the n-th chrominance signal becomes the gradation signal S101 having plural bits (each of the others becomes the binary signal S102 having 1 bit) in the last frame.

Moreover, for example, in case there are the n number of types of chrominance signals, while the number of frames in the frame group is more than the number n of types of the chrominance signal, the gradation signal S101 having plural bits is assigned to only one of the chrominance signals with respect to the first frame to the n-th frame in the plural frames, whose number is equal to the number of frames in the frame group, just like the case where the number of the frames in the frame group is equal to the n number of the types of the chrominance signals. Meanwhile, in all frames after the n-th frame, the binary signal is assigned to each chrominance signal. However, in the frames after the n-th frame, if all the chrominance signals had 1 bit, there would be inequality in terms of the number of bits between the frames from the first to the n-th, and the frames after the n-th frame. Therefore, a binary signal having plural bits, which has been prepared from bit expansion of the binary signal S102 having 1 bit, is assigned to one of the chrominance signals (for example, the n-th chrominance signal), while the binary signal having 1 bit is assigned to each of the other chrominance signals.

In this manner, set is the assignment of the gradation signal S101 and the binary signal S102 respectively to each of the plural chrominance signals that constitute each pixel signal of the input digital video signal. This avoids that a plurality of bits are respectively assigned to the plural chrominance signals in each pixel signal, thereby attaining a minimum total number of bits of the respective pixel signals.

Each of the plural data transmission lines 30A transmits 1 bit of the pixel signal, which expresses the information of each pixel of the transmission data S301 that has been transmitted via the data transmission lines 30A. In other words, the plural data transmission lines 30A carry out the parallel transmission. A plurality of the data transmission lines 30B respectively transmit 1 bit of the flag signal S201.

The bit expansion circuit 40 assigns the respective bits of each pixel signal of the transmission data S301 that has been transmitted via the data transmission lines 30A, to the respective chrominance signals in accordance with the flag signal S201. Meanwhile, the bit expansion circuit 40 carries out bit expansion of only the chrominance signal to which 1 bit is assigned, so that there is equality among the respective chrominance signals of each pixel signal in terms of the number of bits. Thus, only the chrominance signal to which 1 bit is assigned is subjected to the bit expansion so as to let the chrominance signal to have the same number of bits as the chrominance signals to which plural bits are assigned.

Figure 2:
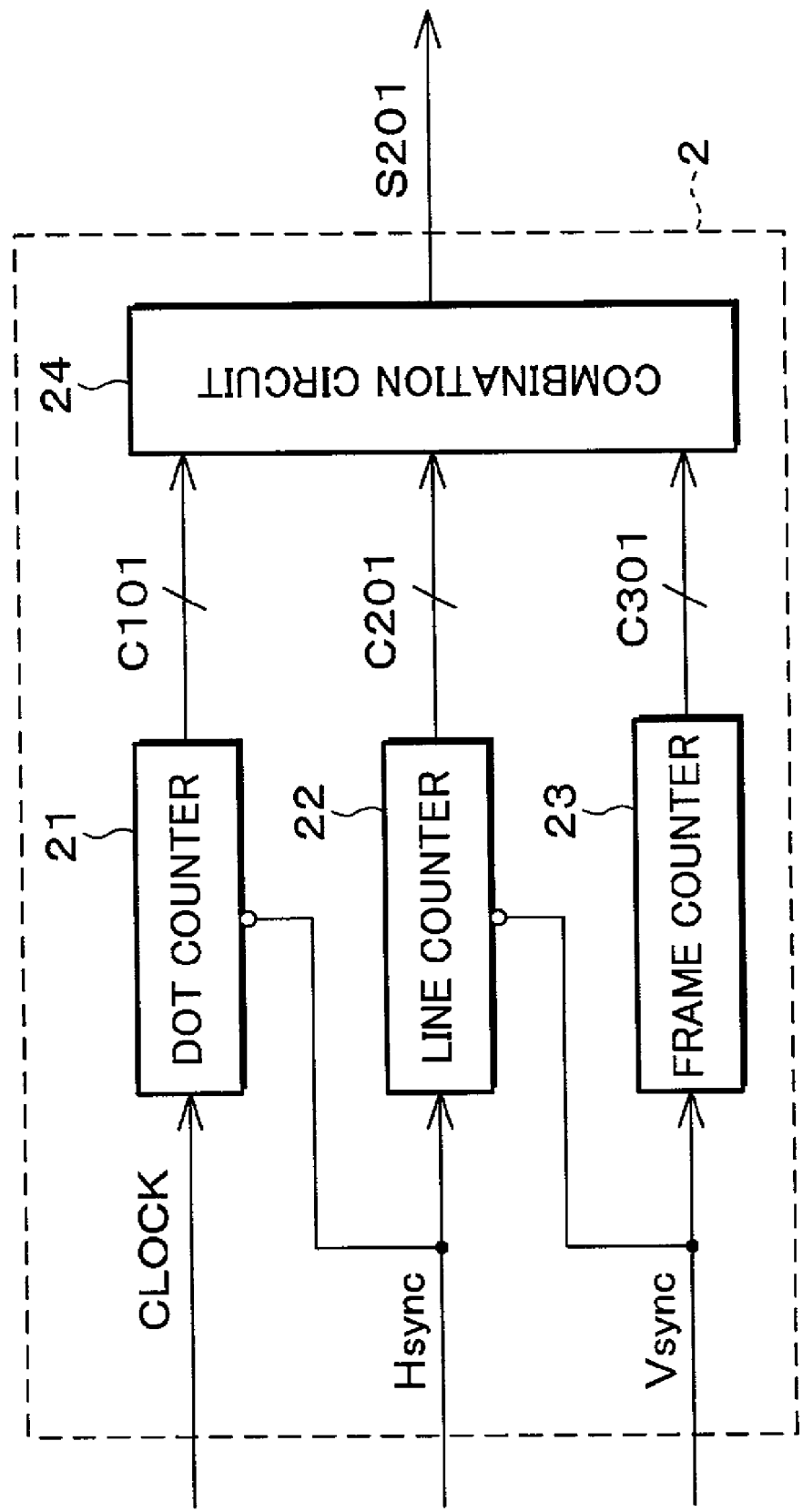
FIG. 2 is a schematic block diagram illustrating a constitution of a flag signal generation circuit incorporated in the digital video signal transmission apparatus.

In the following, described in detail is a constitution of the flag signal generation circuit 2, with reference to FIG. 2.

To begin with, the flag signal generation circuit 2 is provided with a dot counter 21, a line counter 22, a frame counter 23 and a combination circuit 24.

The dot counter 21 receives a data clock signal CLOCK and a horizontal synchronizing signal Hsync. The dot counter 21 counts up cycles of the data clock signal CLOCK one by one. A resultant of the counting is a count value C101. The count value C101 is outputted from the dot counter 21 to the combination circuit 24. Furthermore, the dot counter 21 resets the count value C101 to 1 every cycle of the horizontal synchronizing signal Hsync. Therefore, the count value C101 indicates a horizontal position of the transmission data, which is being transmitted via the respective data transmission lines 30A, in a single scanning line.

The line counter 22 receives the horizontal synchronizing signal Hsync and a vatical synchronizing signal Vsync. The line counter 22 counts up cycles of the horizontal synchronizing signal Hsync one by one. A resultant of the counting is a count value C201. The count value C201 is outputted from the line counter 22 to the combination circuit 24. Further, the line counter 22 resets the count value C201 to 1 every cycle of the vertical synchronizing signal Vsync. Therefore, the count value C201 indicates which scanning line in a frame currently displayed corresponds to the transmission data, which is being transmitted via the respective data transmission lines 30A.

The frame counter 23 receives the vertical synchronizing signal Vsync. The frame counter 23 counts up cycles of the vertical synchronizing signal Vsync one by one. A resultant of the counting is a count value C301. The count value C301 is outputted from the frame counter 23 to the combination circuit 24. Moreover, the frame counter 23 resets the count value C301 to 1 every cycle of the frames. In the cycle of the frames, one chrominance signal is expressed by means of the gradation signal S101 having plural bits. For example, the cycle of the frames includes four frames (four frame cycle), which is four time longer than the cycle of the vertical synchronizing signal Vsync, the frame counter 23 resets the count value S301 every four frame cycle. Therefore, the count value C301 indicates which frame is the transmission data, which is being transmitted via the respective data transmission lines 30A, among the frames in the frame cycle in which one chrominance signal is expressed by means of the gradation signal S101 having plural bits.

Note that, the counters 21 through 23 are composed of a binary counter, respectively, so that the counters 21 through 23 output the counter values C101 to C301 having plural bits to the combination circuit 24.

The combination circuit 24 receives the count values C101, C201, and C301, and combines the count values C101 to C301 so as to determine a value of the flag signal S201. Then, the combination circuit 24 outputs the flag signal S201 to the bit expansion circuit 40.

Next, explained is how the digital video signal is transmitted in the constitution of the digital video signal transmission apparatus.

To begin with, the digital video signal is inputted to the digital video signal conversion circuit 1 of the bit compression circuit 50. Then, the digital video signal conversion circuit 1 converts each chrominance signal (the gradation signal having plural bits), which constitutes each pixel signal of the digital video signal, in such a manner that every plural frames (frame group) (a) in one frame, each of the chrominance signals is converted into the gradation signal S101 having plural bits that is smaller than the number of bits of the respective chrominance signals, and (b) in the other frames in the frame group, each of the chrominance signals is converted into the binary signal S102 having 1 bit (the ON-OFF state signal having a value of 0 or a value of 1). In this way, attained is the average of the gradation levels (the luminance level) of the respective chrominance signals in the plural frames after conversion that is substantially equal to the gradation level of the chrominance signals in the single frame before conversion.

Subsequently, the signals obtained via the conversion, namely, the gradation signal S101 having plural bits in the plural frames and the binary signal S102 having 1 bit, are outputted from the digital video signal conversion circuit 1 to the converted data combination circuit 3.

The flag signal generation circuit 2 generates the flag signal S201, which assigns the gradation signal S101 having plural bits and the binary signal S102 having 1 bit, in accordance with the synchronizing signals inputted therein. With the assignment, the plural chrominance signals (adjacent plural dots), which constitute each pixel signal, are so set that one of the chrominance signals (one dot) is set to be converted into the gradation signal S101 having plural bits (alternatively a binary signal having plural bits), while each of the rest of the chrominance signals (the rest of the dots) is set to be converted into the binary signal S102 having 1 bits. The flag signal S201 is outputted to the converted data combination circuit 3, while being outputted to the bit expansion circuit 40 via the data transmission lines 30B.

The converted data combination circuit 3 receives the gradation signal S101 having plural bits and the binary signal S102 having 1 bit, which have been outputted from the digital video signal conversion circuit 1, and the flag signal S201 that has been outputted from the flag signal generation circuit 2. The converted data combination circuit 3 combines the gradation signal S101 having plural bits and the binary signal S102 having 1 bit, in accordance with the flag signal S201, so as to carry out the bit compression of the input digital video signal, and outputs the compressed input digital video signal, as the transmission data S301, which has been subjected to the bit compression, to the bit expansion circuit 40 via the data transmission lines 30A.

The transmission data S301 include a pixel signal that indicates information of one pixel. The pixel signal is divided per bit among the respective data transmission lines 30A, and transmitted by the parallel transmission.

The bit expansion circuit 40 receives the transmission data S301 that have been transmitted via the data transmission lines 30A, and the flag signal S201 that has been transmitted via the data transmission lines 30B. In the bit expansion circuit 40, the transmission data S301 are subjected to the bit expansion in accordance with the flag signal S201, on contrary to the bit compression carried out in the converted data combination circuit 3. The resultant digital video signal is outputted as an output digital video signal.

Figure 3:
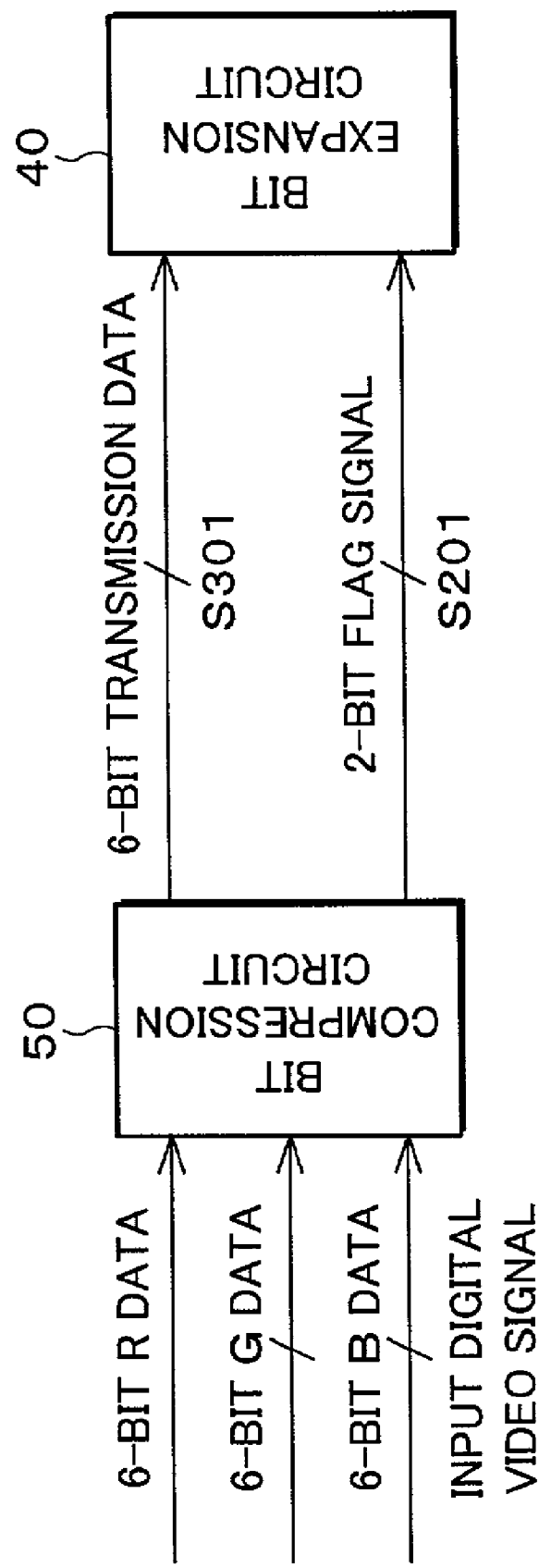
FIG. 3 is a schematic block diagram showing an example how bit compression is carried out for converting an input digital video signal into a transmission signal (including transmission data and a flag signal) in the digital video signal transmission apparatus.

Discussed below is a case where, in the digital video signal transmission apparatus 100 having the above-discussed constitution (a) the input digital video signal, which has 18 bits in total (a sum of 6 bits of each RGB) (that is, the input digital video signal has 64 gradations) as shown in FIG. 3, is converted into the transmission data S301 having 6 bits, and (b) the transmission data S301 are transmitted via the data transmission lines 30A and 30B, together with the flag signal S201 having 2 bits, which is generated for the combination carried out in the conversion data combination circuit 3. Moreover, in this case, the digital video signal conversion circuit 1 converts the input digital video signal in such a manner that, in each frame group having four frames, in one frame, the input digital video signal is converted into the gradation signal S101 having 4 bits, while, in the other frames, the input digital video signal is converted into the binary signal S102 having 1 bit. The converted data combination circuit 3 assigns the gradation signal S101 having 4 bits (alternatively, the binary signal having 4 bits) to one chrominance signal (one dot) of the three chrominance signals R, G, and B (adjacent three dotes, R, G and B), which constitute the each pixel signal, and assigns the binary signal S102 having 1 bit to the rest of the chrominance signals (the rest of the dots).

In the digital video signal conversion circuit 1, each pixel signal of the input digital video signal is converted in such a manner that, in each frame group having 4 frames, each of the chrominance signals having 6 bits, which constitute each pixel signal of the input digital video signal, is converted into the gradation signal S101 having 4 bits, while each of the chrominance signals is converted into the binary signal S102 having 1 bit in the rest of the frame, in order that the average of the gradation levels of the chrominance signals in the plural frames after conversion is substantially equal to the gradation level of the chrominance signals in the single frame before conversion.

For example, the conversion is carried out by the digital video signal conversion circuit 1 in accordance with conversion tables in Tables 1 and 2. In the conversion, each of the chrominance signals, which constitute each pixel of the input digital video signal, is converted into the chrominance signal having four frames so that the average of the gradation levels of the chrominance signals in the plural frames after conversion is substantially equal to the gradation level of the respective chrominance signals in the single frame before the conversion.

TABLE 1

| GRADATION OF IDVS | PS OF IDVS | 4 FRAMES AFTER CONV. | | | | |
|---|---|---|---|---|---|---|
| | | 1st | 2nd | 3rd | 4th | AVE. G |
| 0/63 | 000000 | 0000 | 0 | 0 | 0 | 0/60 |
| 1/63 | 000001 | 0000 | 0 | 0 | 0 | 0/60 |
| 2/63 | 000010 | 0000 | 0 | 0 | 0 | 0/60 |
| 3/63 | 000011 | 0000 | 0 | 0 | 0 | 0/60 |
| 4/63 | 000100 | 0001 | 0 | 0 | 0 | 1/60 |
| 5/63 | 000101 | 0010 | 0 | 0 | 0 | 2/60 |
| 6/63 | 000110 | 0011 | 0 | 0 | 0 | 3/60 |
| 7/63 | 000111 | 0100 | 0 | 0 | 0 | 4/60 |
| 8/63 | 001000 | 0101 | 0 | 0 | 0 | 5/60 |

TABLE 1-continued

| GRADATION OF IDVS | PS OF IDVS | 4 FRAMES AFTER CONV. | | | | |
|---|---|---|---|---|---|---|
| | | 1st | 2nd | 3rd | 4th | AVE. G |
| 9/63 | 001001 | 0110 | 0 | 0 | 0 | 6/60 |
| 10/63 | 001010 | 0111 | 0 | 0 | 0 | 7/60 |
| 11/63 | 001011 | 1000 | 0 | 0 | 0 | 8/60 |
| 12/63 | 001100 | 1001 | 0 | 0 | 0 | 9/60 |
| 13/63 | 001101 | 1010 | 0 | 0 | 0 | 10/60 |
| 14/63 | 001110 | 1011 | 0 | 0 | 0 | 11/60 |
| 15/63 | 001111 | 1100 | 0 | 0 | 0 | 12/60 |
| 16/63 | 010000 | 1101 | 0 | 0 | 0 | 13/60 |
| 17/63 | 010001 | 1110 | 0 | 0 | 0 | 14/60 |
| 18/63 | 010010 | 1111 | 0 | 0 | 0 | 15/60 |
| 19/63 | 010011 | 0001 | 1 | 0 | 0 | 16/60 |
| 20/63 | 010100 | 0010 | 1 | 0 | 0 | 17/60 |
| 21/64 | 010101 | 0011 | 1 | 0 | 0 | 18/60 |
| 22/63 | 010110 | 0100 | 1 | 0 | 0 | 19/60 |
| 23/63 | 010111 | 0101 | 1 | 0 | 0 | 20/60 |
| 24/63 | 011000 | 0110 | 1 | 0 | 0 | 21/60 |
| 25/63 | 011001 | 0111 | 1 | 0 | 0 | 22/60 |
| 26/63 | 011010 | 1000 | 1 | 0 | 0 | 23/60 |
| 27/63 | 011011 | 1001 | 1 | 0 | 0 | 24/60 |
| 28/63 | 011100 | 1010 | 1 | 0 | 0 | 25/60 |
| 29/63 | 011101 | 1011 | 1 | 0 | 0 | 26/60 |
| 30/63 | 011110 | 1100 | 1 | 0 | 0 | 27/60 |
| 31/63 | 011111 | 1101 | 1 | 0 | 0 | 28/60 |

ABBREVIATION:
1) GRADATION OF IDVS means "the gradation of input digital video signal".
2) PS OF IDVS means "pixel signal of input digital video signal".
3) 4 FRAMES AFTER CONV. means "4 frames after conversion.
4) AVE. G means "average of gradations of 4 frames after data conversion".
5) 1st, 2nd, 3rd and 4th respectively means first frame, second frame, third frame and fourth frame.

TABLE 2

| GRADATION OF IDVS | PS OF IDVS | 4 FRAMES AFTER CONV. | | | | |
|---|---|---|---|---|---|---|
| | | 1st | 2nd | 3rd | 4th | AVE. G |
| 32/63 | 100000 | 1110 | 1 | 0 | 0 | 29/60 |
| 33/63 | 100001 | 1111 | 1 | 0 | 0 | 30/60 |
| 34/63 | 100010 | 0001 | 1 | 1 | 0 | 31/60 |
| 35/63 | 100011 | 0010 | 1 | 1 | 0 | 32/60 |
| 36/63 | 100100 | 0011 | 1 | 1 | 0 | 33/60 |
| 37/63 | 100101 | 0100 | 1 | 1 | 0 | 34/60 |
| 38/63 | 100110 | 0101 | 1 | 1 | 0 | 35/60 |
| 39/63 | 100111 | 0110 | 1 | 1 | 0 | 36/60 |
| 40/63 | 101000 | 0111 | 1 | 1 | 0 | 37/60 |
| 41/63 | 101001 | 1000 | 1 | 1 | 0 | 38/60 |
| 42/63 | 101010 | 1001 | 1 | 1 | 0 | 39/60 |
| 43/63 | 101011 | 1010 | 1 | 1 | 0 | 40/60 |
| 44/63 | 101100 | 1011 | 1 | 1 | 0 | 41/60 |
| 45/63 | 101101 | 1100 | 1 | 1 | 0 | 42/60 |
| 46/63 | 101110 | 1101 | 1 | 1 | 0 | 43/60 |
| 47/63 | 101111 | 1110 | 1 | 1 | 0 | 44/60 |
| 48/63 | 110000 | 1111 | 1 | 1 | 0 | 45/60 |
| 49/63 | 110001 | 0001 | 1 | 1 | 1 | 46/60 |
| 50/63 | 110010 | 0010 | 1 | 1 | 1 | 47/60 |
| 51/63 | 110011 | 0011 | 1 | 1 | 1 | 48/60 |
| 52/63 | 110100 | 0100 | 1 | 1 | 1 | 49/60 |
| 53/64 | 110101 | 0101 | 1 | 1 | 1 | 50/60 |
| 54/63 | 110110 | 0110 | 1 | 1 | 1 | 51/60 |
| 55/63 | 110111 | 0111 | 1 | 1 | 1 | 52/60 |
| 56/63 | 111000 | 1000 | 1 | 1 | 1 | 53/60 |
| 57/63 | 111001 | 1001 | 1 | 1 | 1 | 54/60 |
| 58/63 | 111010 | 1010 | 1 | 1 | 1 | 55/60 |
| 59/63 | 111011 | 1011 | 1 | 1 | 1 | 56/60 |
| 60/63 | 111100 | 1100 | 1 | 1 | 1 | 57/60 |
| 61/63 | 111101 | 1101 | 1 | 1 | 1 | 58/60 |
| 62/63 | 111110 | 1110 | 1 | 1 | 1 | 59/60 |
| 63/63 | 111111 | 1111 | 1 | 1 | 1 | 60/60 |

ABBREVIATION:
1) GRADATION OF IDVS means "gradation of input digital video signal".
2) PS OF IDVS means "pixel signal of input digital video signal".
3) 4 FRAMES AFTER CONV. means "4 frames after conversion.
4) AVE. G means "average of gradations of 4 frames after data conversion".
5) 1st, 2nd, 3rd and 4th respectively means first frame, second frame, third frame and fourth frame.

The example of the conversion tables in Tables 1 and 2 are for the data conversion of each of the chrominance signals having 6 bits, which constitute each pixel signal of the input digital video signal, into (a) the gradation signal S101 having 4 bits, which indicates the chrominance signal of a first frame in the frame group, and (b) the binary signal S102 having 1 bit, which indicates the rest of the chrominance signals of second to fourth frames by taking a value of 0 or a value of one.

As shown in Tables 1 and 2, when gradations are expressed in four frames by using the gradation signal S101 having 4 bits and the binary signal S102 having 1 bit, the gradations, which can be expressed as an average of the gradation levels in the four frames, fall into a range from 0/60 gradation to 60/60 gradation, because the gradation levels that can be indicated by the gradation signal S101 having 4 bits are between 0/15 and 15/15. Thus, there are 61 gradations after the data conversion. Because of this, there is short of gradations by three gradations, compared with the number of the gradations of 64 bits in the chrominance signals having 6 bits, which constitute each pixel signal of the input digital video signal. Therefore, in the present example, carried out is such data conversion that an input signal (in other words, chrominance signals having 6 bits, which constitute each pixel signal of the input digital video signal) having four gradations from "000000", (0/63 gradation) to "000011" (3/63 gradation) are converted into digital video signals, which are indicative of four frames, indicating the same gradation, that is, indicating 0/60 gradation as an average. Especially when the gradation is close to 0 gradation, this lowers the gradation to the 3/63 gradation at most due to the data conversion. But, such a little change in the gradations makes no problem.

Moreover, as to the input data after "000100" (4/63 gradation), it is arranged that the average gradation level of the digital video signal for indicating four frames, which has been subjected to the data conversion, is increased by 1/60 gradation, every time the gradation level of the input data is increased 1/63 gradation.

For example, when all the chrominance signals of a certain pixel signal of the input data are "010010", the input data is subjected to the data conversion, so that, in each frame group, in one frame, each chrominance signal is converted into a gradation signal S101 having 4 bits and 15/15 gradation, while in the rest of the frames, each chrominance signal is converted into the binary signal S102 (an OFF-state signal, equivalent to 0/15 gradation) having 1 bit that indicates "0". Thus, an average of gradations in the four frames is 15/60 gradation. Meanwhile, when three chrominance signals, which constitute the pixel signal, are respectively altered from "010010" to "010011", thereby increasing the gradation to 1/63 gradation, (a) in the first frame, each chrominance signal is converted into the gradation signal S101 having 4 bits and 1/15 gradation, (b) in the second frame, each chrominance signal is converted into the binary signal S102 (an ON-state signal, equivalent to the 15/15 gradation) having 1 bit, which indicates "1", and (c) in the rest of the frames, each chrominance signal is converted into the binary signal S102 (an OFF-state signal) having 1 bits, which indicates "0". The average of the gradations in the four frames is 16/60. Thus, the gradation is increased by 1/60 gradation after the data conversion.

In addition, because there is no short of gradation by three gradations, it is possible to indicate the gradation of the four frames, without changing the number of frames, by using a gradation signal S101 having five bits, instead of the gradation signal S101 having 4 bits, in other words, by using the gradation signal S101 having five bits and the binary signal S102 having 1 bit. In this case, it is possible to express 125 gradations. Therefore, it is possible to approximately express the gradations of the input data with further diminished errors by assigning the 64 gradations of the input digital video signal to 64 gradations out of the 125 gradations that has been subjected to the data conversion, in such a manner that there is substantially equality between (a) the average of the gradation levels of the four frames of the digital video signal that has been subjected to the data conversion, and (b) the gradation level of the input digital video signal.

As discussed above, it is possible to approximately express the gradation of the input digital video signal with further diminished errors when the numbers of bits contained in the gradation signal S101 is increased by 1 bit.

Next, the flag signal generation circuit 2 generates the flag signal S201 having 2 bits. The flag signal S201 having 2 bits is for assigning each digital video signal (RGB data), which has been converted into the gradation signal S101 having 4 bits and the binary signal S102 having 1 bit, respectively to the three chrominance signals R, G and B (adjacent three dots RGB) that constitute each pixel signal. According to the flag signal S201, the gradation signal S101 having 4 bits (or the binary signal having 4 bits, which has been prepared by the bit expansion of the binary signal S102 is assigned to one of the chrominance signal (one dot) of the three chrominance signals R, G, and B, which constitute each pixel signal, while the binary signal S102 having 1 bit is assigned to the other two chrominance signals (the rest of the dots).

Provided below is a detailed explanation on a method of generating the flag signal S201 having 2 bits, with reference to Table 3 and FIG. 4.

TABLE 3

| FLAG SIGNAL | R | G | B |
| --- | --- | --- | --- |
| 0 0 | 4 BITS | 1 BIT | 1 BIT |
| 0 1 | 1 BIT | 4 BITS | 1 BIT |
| 1 0 | 1 BIT | 1 BIT | 4 BITS |
| 1 1 | 1 BIT | 1 BIT | 4 BIT * |

(Note: 4 bits * is a binary signal.)

Table 3 shows an example of the setting of the assignment of the transmission data S301, illustrating how the transmission data S301 are assigned to the chrominance signals R, G and B having 6 bits, which constitute each pixel signal, in accordance with the instructions indicated by a value of the flag signal S201.

The flag signal S201 having 2 bits, as shown in Table 3, first to third rows, instructs the assignment of the pixel signal having 6 bits, which indicates the information of each pixel, to the chrominance signals R, G and B, in such a manner that one chrominance signal (one dot) among the three chrominance signals R, G and B (adjacent three dots, RGB), which constitute each pixel signal, is converted to the gradation signal S101 having 4 bits, while each of the other two chrominance signals (the other two dots) is converted into the binary signal S102 having 1 bit. Therefore, the flag signal S201 can take three values, namely: (a) "00", a value for instructing to assign the gradation signal S101 having 4 bits to the chrominance signal R, (b) "01", a value for instructing to assign the gradation signal S101 having 4 bits to the chrominance signal G, and (c) "10", a value for instructing to assign the gradation signal S101 having 4 bits to the chrominance signal B.

However, in this case, the number of frames (which is four) in the frame group is greater than the number of the chrominance signals (which is three). Therefore, in each pixel, there is one frame in which the gradation signal S101 having 4 bits is not assigned to the respective chrominance signals. In other words, with respect to each pixel signal, in three out of four frames, which constitute the frame group, the gradation signal S101 having 4 bits is assigned to one of the chrominance signals R, G and B, while the binary signal S102 having 1 bit is assigned to each of the other two chrominance signals. Meanwhile, in the other one of the four frames, the binary signal S102 is assigned to the respective chrominance signals R, G and B. The pixel, in which each of the chrominance signals R, G and B is converted into the binary signal, cannot have an identical number of bits with respect to the other frames if the binary signal S102 having 1 bit is assigned to each of the chrominance signals R, G and B. To solve this problem, assigned to the chrominance signal B in the pixel is the binary signal having 4 bits that indicates the 0/15 gradation or the 15/15 gradation, in other words, a signal having 4 bits that takes one of the values "0000" (the 0/15 gradation) and "1111" (the 15/15 gradation), but not the gradation signal 101 having 4 bits. Therefore, the flag signal S201, as shown in Table 3, can take a value "11" that can assign the binary signal S102 having 1 bit to each of the chrominance signals R and G, and can assign the binary signal having 4 bits to the chrominance signal B. Note that, the binary signal having 4 bits is generated by the bit expansion of the binary signal S102 having 1 bit (in this case, the binary signal S102 having 1 bit assigned to chrominance signal B) by the converted data combination circuit 3.

Next, as shown in FIG. 4, the flag signal S201 is set in terms of adjacent four pixels of four frames (a frame 1 to a frame 4), in accordance with the setting values shown in Table 3. The Flag signal S201 is set so that (a) in one of the four frames, each of the three chrominance signals R, G, and B, which constitute each pixel, is to be converted into the gradation signal S101 having 4 bits, (b) in the other frames (three out of the four frames), each of the chrominance signals is to be converted into the binary signal S102 having 1 bit or the binary signal having 4 bits, while only one of the three chrominance signals, R, G, and B, which constitute each pixel, is to be converted into the gradation signal S101 having 4 bits, or the binary signal having 4 bits, and each of the other two chrominance signals is to be converted into the binary signal S102 having 1 bit. In short, the setting values of the flag signal S201 makes a difference in terms of one pixel signal among four frames that constitute one frame group.

Moreover, in the present example, there are a difference among the adjacent four pixels, in terms of the setting value of the flag signal S201, that is, the setting for assigning the gradation signal S101 and the binary signal S102 to the plural chrominance signals that constitute each pixel signal. In other words, the flag signal S201 is set, with respect to each frame in each pixel, so that in one pixel out of the adjacent four pixels, each chrominance signal is to be converted into the gradation signal S101 having 4 bits, while in the other pixels, each chrominance signal is to be converted into the binary signal S102 having 1 bit, or the binary signal having 4 bits. Specifically, in one of the adjacent four pixels, the gradation signal S101 having 4 bits is assigned only to the chrominance signal R. In another one of the four adjacent pixels, the gradation signal S101 is assigned only to the chrominance signal G. Further, in still another one of the four adjacent pixels, the gradation signal S101 having 4 bits is assigned only to the chrominance signal B, and in the yet another one of the four adjacent pixels, the binary signal is assigned to each of the chrominance signals. However, in the yet another one of the four adjacent pixels, the binary signal having 4 bits is assigned to one of the chrominance signal (B), while the binary signal S102 having 1 bit is assigned to each of the other chrominance signals (R and G), in order to have an identical number of bits with respect to the other pixels.

The following is the reason why the value of the flag signal S201 is so set as to make a difference among the adjacent four pixels. For example, when each of the setting values of the flag signal S201 for the respective pixels is equal to each other, phases of the slight change in the gradations of the output image are uniformed in the entire screen. Because of this, there is a possibility that the change in the gradations is perceived as flickering by human eyes. On the contrary, if the flag signal S201 is set at different values for each of the adjacent four pixels, the phases of the slight change in the gradations of the output image are shifted in different ways from each other in each of the adjacent four pixels, thereby reducing the possibility that the slight change in the gradations of the output image is perceived by human eyes.

Note that, when it is less likely that the slight change in the gradations of the output image is perceived by human eyes, for example, in case of high frame frequency, it is possible to set the flag signal S201 at an identical value for each of the pixels in one frame.

In case the setting is done as shown in FIG. 4, the flag signal S201 is set by the flag signal generation circuit 2 as follows, for example.

To begin with, the respective pixels are assigned as follows: (a) when the count value C101 of the dot counter 21 is an odd number, while the count value C201 of the line counter 22 is also an odd number, then each of the pixels is assigned to a pixel (X1, Y1), (b) when the count value C101 of the dot counter 21 is an even number, while the count value C201 of the line counter 22 is an odd number, then each of the pixels is assigned to a pixel (X2, Y1), (c) when the count value C101 of the dot counter 21 is an odd number, while the count value C201 of the line counter 22 is an even number, then each of the pixel is assigned to a pixel (X1, Y2), (d) when the count value C101 of the dot counter 21 is an even number, while the count value C201 of the line counter 22 is also an even number, then each of the pixels is assigned to a pixel (X2, Y2).

Here, in the case where each of the pixels is assigned to a pixel (X1, Y1) because the count value C101 of the dot counter 21 is an odd number, while the count value C201 of the line counter 22 is also an odd number, the flag signal S201 is set to be "10" in frame 1, "01" in frame 2, "00" in frame 3, and "11" in frame 4. Moreover, when each of the pixels is assigned to a pixel (X2, Y1) because the count value C101 of the dot counter 21 is an even number, while the count value C201 of the line counter 22 is an odd number, the flag signal S201 is set to be "11" in frame 1, "10" in frame 2, "01" in frame 3, and "00" in frame 4. As to other pixels, setting is carried out in similar manners, accordingly. As a result, generated are such flag signal S201 as shown in FIG. 4. Furthermore, if the numbers of the pixels is so large as to require an m number of rows and an n number of columns to make a similar table as FIG. 4, where m and n are integral numbers greater than 2, the flag signal S201 can be prepared in a similar manner as the case of the table having two rows and two columns, where the number of pixels requires only two rows and two columns to make the table for the pixels.

The converted data combination circuit 3 assigns the gradation signal S101 having plural bits and the binary signal S102 having 1 bit to the chrominance signals R, G and B that constitute each pixel signal of the four frames, in accordance with the values of the flag signal S201 shown in FIG. 4, and with reference to how the number of bits is assigned to each of the chrominance signals R, G, and B, as shown in Table 3. However, the converted data combination circuit 3 generates the binary signal having 4 bit by the bit expansion of the binary signal having 1 bit assigned to the chrominance signal B when the flag signal S201 is "11", and assigns the binary signal having 4 bits to the chrominance signal B, instead of the binary signal S102 of 1 bit. As a result, the number of bits in each of the chrominance signals R, G and B, which constitute each pixel signal of the four frames, is as shown in FIG. 5.

As shown in FIG. 5, in the transmission data S301, among the three chrominance signals R, G and B (adjacent three dots, RGB), which constitute each pixel signal, one of the chrominance signals (one dot) is set to be converted to the gradation signal S101 having 4 bits (or the binary signal having 4 bits), while the other chrominance signals (the other dots) are set to be converted to the binary signal S102 having 1 bit. Therefore, each pixel signal has 6 bits.

The chrominance signals R, G, and B, which constitute each pixel signal are set so that, in each of four frames, in one frame, each of the chrominance signals is assigned to the gradation signal S101 having 4 bits, while in the other frames, each of the chrominance signals is assigned to the binary signal S102 having 1 bit.

However, as discussed previously, when the flag signal S201 is "11", B is set to be converted into the binary signal having 4 bits, which indicates 0/15 gradation or 15/15 gradation. Therefore, only B is set to be converted into a signal having 4 bits in two frames every four frames. In one of the two frames every four frames, the chrominance signal B is set to be converted into the binary signal having 4 bits (the ON-OFF state signal that indicates 0/15 gradation and 15/15 gradation). Therefore, the chrominance signal B is also set to be converted to the gradation signal S101 having 4 bits in one frame every four frames, just like the chrominance signals R and G.

Moreover, considering a case where the digital video signal conversion circuit 1 carries out the data conversion shown in Tables 1 and 2 while the converted data combination circuit 3 assigns, as shown in FIG. 5, the gradation signal S101 and the binary signal S102 to the chrominance signals RGB, for example if all the chrominance signals RGB of the respective pixel signals of the input digital video signals are "011110", in other words, if all the chrominance signals RGB of the input digital video signal have a gradation level of 30/63 gradation, set as shown in FIG. 6 are the gradation level of each of the chrominance signals RGB, which constitute each pixel signal of the four frames.

In other words, as shown FIG. 6, each of the chrominance signals R, G and B, which constitute each pixel signal, is set to be converted into the gradation signal S101 having the 12/15 gradation in one frame every four frames, while in the another frame every four frames, each of the chrominance signals is set to be converted to the binary signal S102 (ON-state signal) having a value of "1" that indicates the gradation 1. In the other two frames every four frames, each of the chrominance signals is set to be converted into the binary signal S102 (OFF-state signal) having "0" value that indicates gradation 0. Therefore, the average of the gradation levels of the four frames is 27/60 gradation.

However, in this case, again, the chrominance signal B is set to be converted into data having 4 bits in two frames every four frames. In one of the two frames, the chrominance signal B is set to be converted into the gradation signal S101 of 12/15 gradation, while the chrominance signal B is set to the binary signal having 4 bits, which is 0/15 gradation, in the other one of the two frames. In each of the other two frames out of the four frames, the chrominance signal B is set to be converted to the binary signal S102 (ON-state signal) having the value "1" that indicates gradation 1, and the binary signal S102 (OFF-state signal) having the value "0" that indicates gradation 0. Therefore, the chrominance signal B also has an average of gradation levels of the four frames of 27/60 gradation.

Moreover, as to the three chrominance signals R, G and B (adjacent three dots for RGB), which constitute each pixel signal, one of the three chrominance signals (one dot) is set to be converted into the gradation signal S101 having 4 bits (or the binary signal having 4 bits), while each of the other two chrominance signals (the other two dots) are set to be the binary signal S102 having 1 bit.

Next, the bit expansion circuit 40 (a) assigns 6 bits of each pixel signal contained in the transmission data S301 to each of the chrominance signals, in accordance with the flag signal S201 having 2 bits, which has been transmitted, and (b) carries out bit expansion of the transmission data S301 so that the output digital video signal has the respective chrominance signals having 4 bits each. In the bit expansion circuit 40, the chrominance signals, to which the gradation signal having 4 bits is assigned respectively, is not expanded, and used as the gradation signal having 4 bits as it is, while the chrominance signal, to which the binary signal having 1 bit is assigned, is expanded to the gradation signal having 4 bits. In short, the bit expansion circuit 40 carries out the bit expansion so that the transmission data S301 having 6 bits is converted into the expansion data having 12 bits, in which each chrominance signal has 4 bits.

Figure 7:
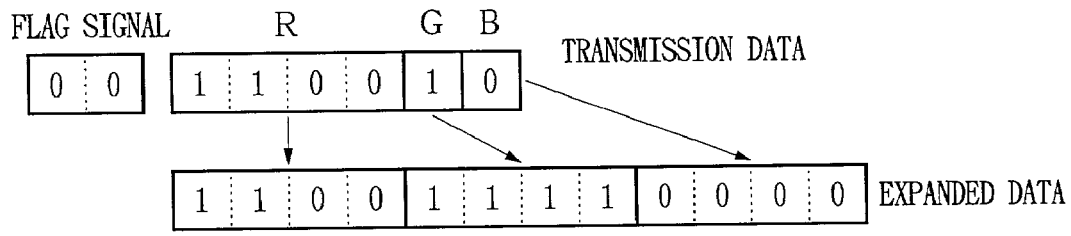
FIGS. 7($a$) through 7($d$) are explanatory views explaining how bit expansion is carried out in accordance with the embodiment of the present invention.
Figure 7:
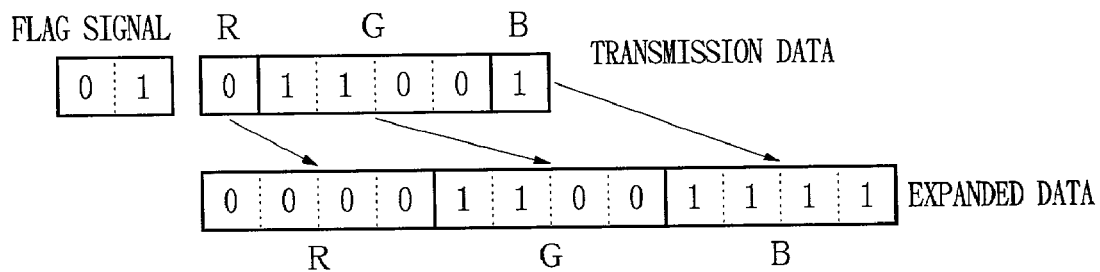
Figure 7:
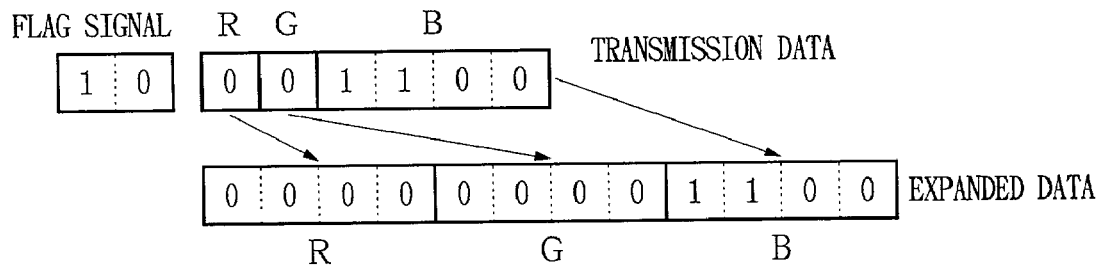
Figure 7:
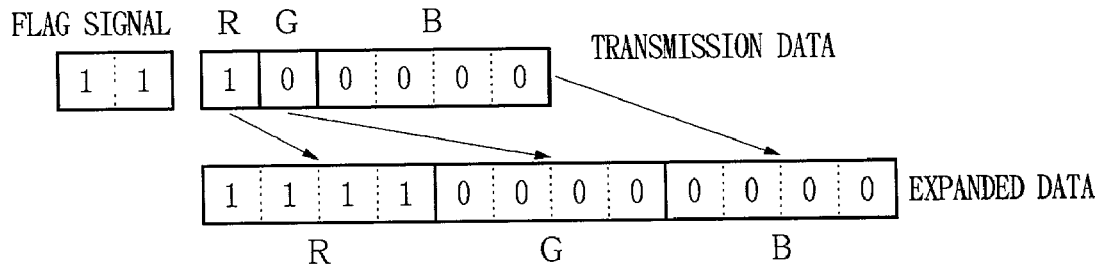

Explained below is how the expansion circuit 40 carries out the bit expansion of the transmission data S301 having 6 bits, with reference to FIG. 7. FIG. 7 illustrates a case where the transmission data S301 having 6 bits is a digital video signal in which the average of the gradation levels of the four frames is 27/60 gradation as shown in FIG. 6, and the digital video signal has been transmitted to the bit expansion circuit 40 via the data transmission lines 30A.

In this case, as shown in FIG. 7, when the flag signal S201 is "00", the chrominance signal R, which is the gradation signal having 4 bits and indicating 12/15 gradation, is used as the gradation signal R having 4 bits as it is. The chrominance signal G, which is the binary signal (ON-state signal) having 1 bit and the value of "1", is subjected to the bit expansion and converted into a signal having 4 bits that indicates 15/15 gradation. The chrominance signal B, which is the binary signal (OFF-state signal) having 1 bit and the value of "0", is also subjected to the bit expansion and converted into a signal having 4 bits that indicates 0/15 gradation. As a result, the transmission data S301 having 6 bits is expanded in terms of bits and converted into data in which each chrominance signal has 4 bits. Moreover, in the bit expansion circuit 40, even when the flag signal S201 takes other values, the chrominance signal, which is the gradation signal having 4 bits, is used as the gradation signal having 4 bits, as it is, while the chrominance signal, which is the binary signal having 1 bit; is expanded in terms of bits so as to have 4 bits, thereby performing the bit expansion for converting the transmission data S301 having 6 bits into the expanded data having 12 bits, in which each of the RGB has 4 bits.

Here, it is explicit in the examples shown in FIGS. 4 through 7 that each example has 27/60 gradation, when considered is the average of the gradation levels of the respective chrominance signals R, G and B of each pixel of the output digital video signal (the expanded data having 12 bits) in the four frame period.

For example, as to the chrominance signal R of a pixel (X1, Y1) in a left-above position, in Frame 1, the flag signal S201 has a value of "10", thus the chrominance signal R is the signal having 1 bit, taking a value of "0". This means the gradation level of the chrominance signal R is 0. Meanwhile, in Frame 2, the flag signal S201 has a value of "01", and the chrominance signal R is the signal having 1 bit, which has a value of "0". Thus, the gradation level is 0. Moreover, in Frame 3, the value of the flag signal S201 is "00". Thus, the chrominance signal R is the gradation signal having 4 bits and a value of "1100". Then, the gradation level is 12/15 gradation. Furthermore, in Frame 4, the flag signal S201 has a value of "11", while the chrominance signal R is the signal having 1 bit, which has a value of "1". Thus, the gradation level is 15/15 gradation. Therefore, in the chrominance signal R of the left-above pixel (X1, Y1) of the output digital video signal, the average of the gradation levels in the four frame period is 27/60 gradation. Similarly, the chrominance signals G and B of the pixel (X1, Y1) and the chrominance signals R, G and B of the other pixels have the average gradation levels of 27/60 gradation in the four frame period.

Therefore, the gradation level (30/63 gradation) of the input digital video signal is substantially maintained in the output digital video signal, with respect to the average of the gradation levels in the four frame period.

As discussed above, the digital video signal transmission apparatus of the present embodiment converts the respective chrominance signals R, G, and B, similar to the ones shown in FIG. 3, which have 6 bits each and are contained in a digital video signal having 18 bits. The conversion is carried out, in order that the average of the gradation levels of the respective chrominance signals RGB in the four frames after the conversion is substantially equal to the average of the gradation levels of the respective chrominance signals RGB in the single frame before the conversion, in such a manner that each of the chrominance signals is converted into the gradation signal S101 having 4 bits in one frame every four frames, while each of the chrominance signals is converted into the binary signal (the signal indicating 0 or 1) S102 having 1 bit in the other three of the four frames. The assignment of the signals S101 and S102 to the respective frames is set in accordance with the flag signal S201. In this way, the digital video signal transmission apparatus generates the transmission data S301 having 6 bits.

The digital video signal transmission apparatus of the present embodiment is required to transmit the flag signal S201 having 2 bits, in association with the transmission data S301 having 6 bits. However, compared with a case where no bit compression by the bit compression circuit 50 is carried out, the number of bits per pixel of the data to be transmitted can be reduced from 18 bits, which is a sum of the bits of the respective RGB having 6 bits each, to 8 bits that is a sum of 6 bits of the transmission data S301 and 2 bits of the flag signal S201. In short, it is possible to achieve reduction in the number of bits by 10 bits. Therefore, ten of the data transmission lines can be curtailed from the system.

Moreover, as discussed above, the digital video signal transmission apparatus of the present embodiment (a) carries out the bit compression of the digital video signal having plural bits, (b) transmits the digital video signal via the data transmission lines 30A and 30B, and (c) performs the bit expansion of the digital video signal that has been transmitted. The digital video signal transmission apparatus is provided with the digital video signal conversion circuit (conversion means) 1, the flag signal generation circuit (generation means) 2, the converted data combination circuit (combination means) 3, and the bit expansion circuit (bit expansion means) 40. The digital video signal conversion circuit 1 carries out such data conversion of the digital video signal having plural bits that the digital video signal having plural bits is converted into the gradation signal S101 having plural bits in one frame every plural frames, while the digital video signal is converted into the ON-OFF state signal having one bit, which has a value of 0 or a value of 1 (that is the binary signal S102 having 1 bit), in the other frames every plural frames, thereby performing the bit conversion of the digital video signal having plural bits. The flag signal generation circuit 2 generates the flag signal S201 in accordance with the synchronizing signals. The flag signal S201 is referred to for assigning the gradation signal S101 having plural bits and the ON-OFF state signal having 1 bit, which have been subjected to the data conversion, to adjacent plural dots (the plural chrominance signals that constitute each pixel signal). To one of the dots (that is, one of the chrominance signals), assigned is the gradation signal S101 having plural bits, while the ON-OFF state signal having one bit is assigned to the other dots of the plural dots (the other chrominance signals of the plural chrominance signals). The converted data combination circuit 3 combines the gradation signal S101 having plural bits and the ON-OFF state signal having 1 bit, so as to prepare the transmission data S301. The bit expansion circuit 40 executes, in accordance with the flag signal S201, the bit expansion so as to convert the transmission data S301 into the digital video signal that is equivalent with the digital video signal before the conversion.

With the arrangement, where provided is the means for carrying out the bit expansion of the digital video signal that has been transmitted via the data transmission lines 30A and 30B after being subjected to the bit compression, it is possible to reduce the number of the data transmission lines. This allows a smaller substrate to be employed and reduces the undesirable radiation noises, even when a larger number of bits are contained in the digital video signal.

It should be noted that, in the above examples, the digital video signal having 18 bits in total, which is composed of the chrominance signals RGB having 6 bits each, is inputted into the digital video signal transmission apparatus 100. However, it is also possible to set the number of the bits of the input digital video signal at the number predetermined in an arbitrary manner.

Furthermore, the number of bits per pixel of the respective chrominance signals of the output digital video signal can be so appropriately set that (a) the number of gradations of the output digital video signal is substantially equal to or sufficiently greater than the number of the gradations of the input digital video signal, and (b) the number of bits per pixel of the respective chrominance signals of the output digital video signal is suitable for the image display apparatus for outputting an image of the output digital video signal. For example, in the above examples, if the image display apparatus for outputting requests that a digital video signal to be inputted should have 18 bits, thus the respective chrominance signals RGB have 6 bits each, the respective chrominance signals of the output digital video signal can be arranged to have 6 bits per pixel. In this case, the number of bits per pixel of the output digital video signal is equal to the number of bits per pixel of the input digital video signal, while the signals, which are transmitted via the data transmission lines 30A and 30B, has 10 bits per pixel, that is satisfactorily smaller than the number of bits per pixel of the input digital video signal.

Furthermore, it is not limited to the above example, where the number of the frames in the frame group is four. It is possible to set the number of the frame in the frame group, arbitrarily. However, in case a period in correspondence with the frame group, that is, one cycle of a period in which the conversion of each of the chrominance signals into the gradation signal having plural bits is carried out once, is prolonged too much, the change in the gradation in the period of a single frame group may be perceived as small flickering by the human eyes. Therefore, it is preferable that the number of the frames in the frame group is set at such a number that the change in the gradation in the period of one frame group may not be perceived as small flickering by the human eyes, considering a number of frames per second of the digital video signal and the characteristics of the image display apparatus. Specifically, for example, if the number of frames per second of the digital video signal is 30, and the image display apparatus to use is a liquid crystal display apparatus of an STN liquid crystal (super twisted nematic) type, it is preferable that the number of the frames in the frame group is 8 or less.

Moreover, in the present embodiment, where the digital video signal conversion circuit 1 carried out the conversion of the respective chrominance signals, which constitute each pixel signal of the input digital video signal, into the respective chrominance signals that constitute each pixel signal of the frame group, the numbers of bits of the four frames in the frame group are not uniformed among the four frames, that is, the numbers of bits are 4 bits, 1 bit, 1 bit and 1 bit.

On the contrary, such an arrangement is also possible that all the four frames in the frame group have an equal number of bits. In this case, since the respective chrominance signals of each pixel signal have bits in an equal number, it is possible to omit the flag signal generation circuit 2, the converted data combination circuit 3, and the data transmission lines 30B and the bit expansion circuit 40 from the system.

However, when an equal number of bits is assigned to each frame as the above case, for example, if the number of bits assigned to each of the four frames in the digital video signal transmission apparatus 100 is altered to be 4 bits, respectively, the number of bits of the signal to be transmitted is 12. This means that twelve of the data transmission lines are required. Thus, it is necessary to have 4 more of the data transmission lines in this case, compared with the previous case where the digital video signal transmission apparatus 100 requires only eight of the transmission lines. Thus, no contribution to the reduction of the number of the transmission lines is made here.

On the contrary, the digital video signal transmission apparatus 100 in accordance with the present invention can have a much smaller number of bits per pixel of the signal to be transmitted via the data transmission path, compared with the case where the conversion is carried out so that the respective chrominance signals have an equal number of bits per pixel. Therefore, the above arrangement can further reduce the data amount of the digital video signal to be transmitted via the data transmission path. Especially, in case of the parallel transmission, where the signal having plural bits, which indicates the information of each pixel, is divided per bit among a plurality of the data transmission lines and transmitted per bit via each of the data transmission lines, the number of the data transmission lines can be reduced much further. As a result, the substrate and the circuit size can be much smaller in size, while the power consumption and the undesirable radiation noises can be further decreased.

Figure 8:
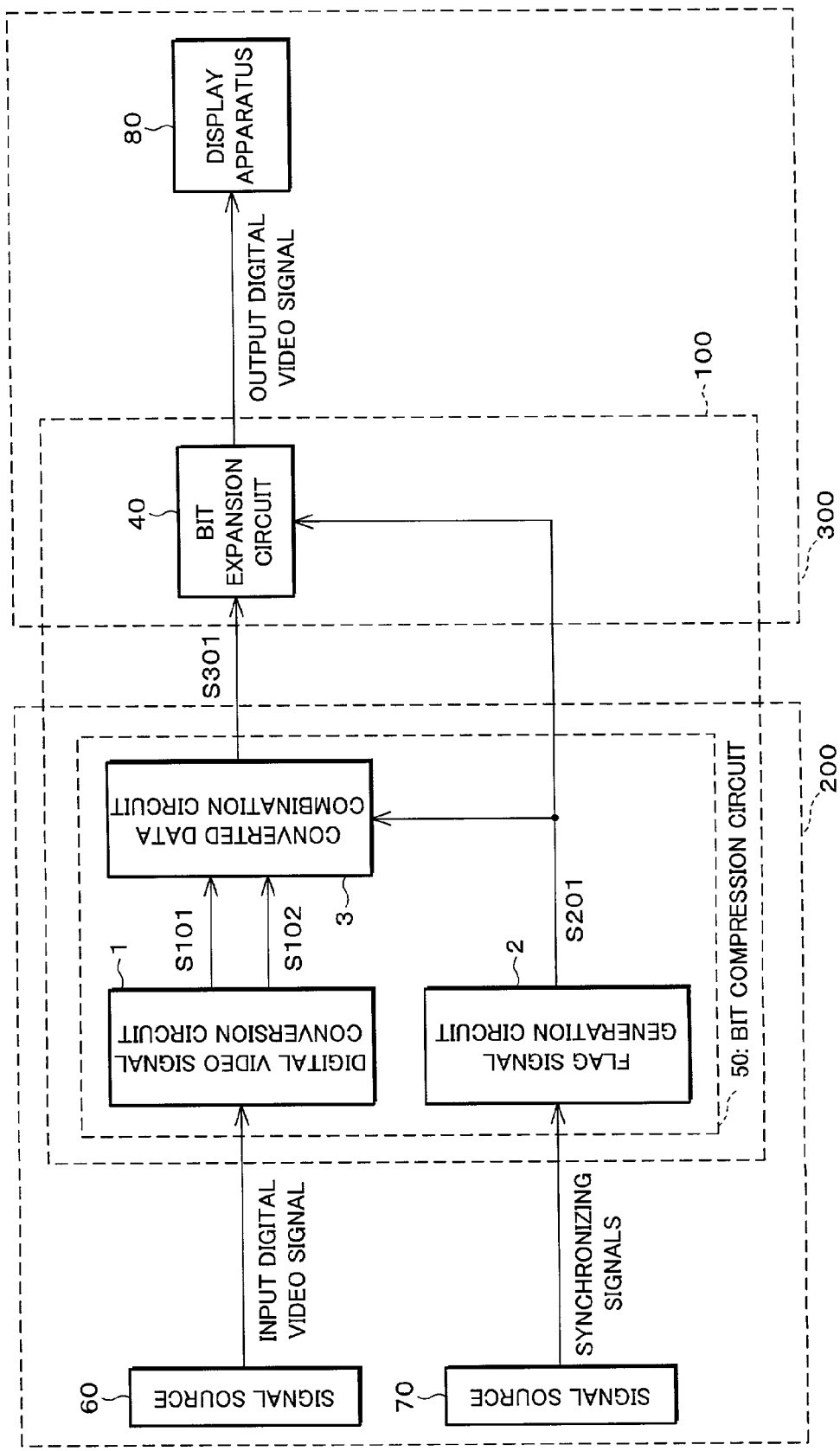
FIG. 8 is a schematic block diagram illustrating a constitution of an image display apparatus of the embodiment of the present invention.

Described below is an image display apparatus incorporated with the digital video signal transmission apparatus 100 of the present invention, with respect to FIG. 8. As shown in FIG. 8, the image display apparatus can be constituted by (a) incorporating the bit expansion circuit 50 in a signal sending circuit 200, which is provided with a signal source 60 for generating the digital video signal and a signal source 70 for generating the synchronizing signal, and (b) incorporating the bit expansion circuit 40 in a signal receiving circuit 300, which is provided with a display apparatus (display means) 80 for displaying an image in accordance with the digital video signal.

For example, in case a digital video signal transmission apparatus 100 is used in an image display apparatus, which is provided with a personal computer as the signal sources 60 and 70, and a liquid crystal panel as the display apparatus 80, the bit compression circuit 50 is mounted in a control board and the like member of the personal computer, while the bit expansion circuit 40 is mounted in a driving substrate or a driver for driving of the liquid crystal panel as the signal receiving circuit 300, so as to constitute the image display apparatus incorporated with the digital video signal transmission apparatus 100.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An digital video signal transmission apparatus, comprising:
   a data transmission path for transmitting a digital video signal in which a plurality of chrominance signals having plural bits per pixel are combined;
   conversion means for converting the respective chrominance signals of the digital video signal to be transmitted, in such a manner that every plural frames (a) in one frame of the plural frames, each of the chrominance signals is converted into a gradation signal having plural bits less or equal to a number of bits contained in each chrominance signal, while (b) in other frames of the plural frames, each of the chrominance signals is converted into a binary signal having 1 bit, so that an average of gradation levels of the respective chrominance signals in the plural frames after the conversion is substantially equal to gradation levels of the respective chrominance signals in a single frame before the conversion;
   flag signal generation means (a) for generating a flag signal for setting how the gradation signal and the binary signal are respectively assigned to each of the chrominance signals, which constitute each pixel signal, so that one of the chrominance signals has plural bits, while the other chrominance signals have 1 bit, and (b) for outputting the flag signal to said data transmission path;
   signal setting means (a) for assigning the gradation signal and the binary signal respectively to each of the chrominance signals, in accordance with the flag signal, so that one of the plural chrominance signals, which constitute each pixel signal, has plural bits, while the other chrominance signals have 1 bit, and (b) for outputting a resultant digital video signal to said data transmission path; and
   bit expansion means for carrying out bit expansion of the digital video signal, which has been transmitted, in accordance with the flag signal that have been transmitted via said data transmission path, so that the respective plural chrominance signals, which constitute each pixel signal, have an equal number of bits.

2. The digital video signal transmission apparatus as set forth in claim 1, wherein said flag signal generation means generates the flag signal so that adjacent plural pixels are respectively supplied with the flag signal having values different from each other.

3. The digital video signal transmission apparatus as set forth in claim 1, wherein
   said conversion means converts each chrominance signal into the gradation signal having plural bits in one frame every frames in an F number, where F is greater than n, and n is a number of types of the chrominance signals, and
   said signal setting means carries out the conversion of the chrominance signals so that, (a) in frames in the n number every frames in the F number, each chrominance signal of one type is converted into the gradation signal having plural bits, and each of the chrominance signals of other types are converted into the binary signal having one bit, and (b) in other frames every frames in the F number, one type of the chrominance signals are converted into the binary signal having plural bits, while other types of the chrominance signals are converted into the binary signal having one bit.

4. The digital video signal transmission apparatus as set forth in claim 1, wherein said conversion means converts each chrominance signal into the gradation signal having plural bits in one frame every four to eight frames.

5. An image display apparatus, which includes a digital video signal transmission apparatus for transmitting a digital video signal in which a plurality of chrominance signals having plural bits per pixel are combined, wherein said digital video signal transmission apparatus includes:
   a data transmission path for transmitting the digital video signal;
   conversion means for converting the respective chrominance signals of the digital video signal to be transmitted, in such a manner that every plural frames (a) in one frame of the plural frames, each of the chrominance signals is converted into a gradation signal having plural bits less or equal to a number of bits contained in each chrominance signal, while (b) in other frames of the plural frames, each of the chrominance signals is converted into a binary signal having 1 bit, so that an average of gradation levels of the respective chrominance signals in the plural frames after the conversion is substantially equal to gradation levels of the respective chrominance signals in a single frame before the conversion;

flag signal generation means (a) for generating a flag signal for setting how the gradation signal and the binary signal are respectively assigned to each of the chrominance signals, which constitute each pixel signal, so that one of the chrominance signals has plural bits, while the other chrominance signals have 1 bit, and (b) for outputting the flag signal to said data transmission path;

signal setting means (a) for assigning the gradation signal and the binary signal respectively to each of the chrominance signals, in accordance with the flag signal, so that one of the plural chrominance signals, which constitute each pixel signal, has plural bits, while the other chrominance signals have 1 bit, and (b) for outputting a resultant digital video signal to said data transmission path; and bit expansion means for carrying out bit expansion of the digital video signal, which has been transmitted, in accordance with the flag signal that have been transmitted via said data transmission path, so that the respective plural chrominance signals, which constitute each pixel signal, have an equal number of bits.

6. An image display apparatus as set forth in claim 5, further comprising:
   display means for displaying an image in accordance with the digital video signal that has been subjected to the bit expansion by said bit expansion means.

7. A digital video signal compression apparatus for reducing a number of bits of a digital video signal in which a plurality of chrominance signals having plural bits per pixel are combined, said digital video signal compression apparatus comprising:
   conversion means for converting the respective chrominance signals of the digital video signal, in such a manner that every plural frames (a) in one frame of the plural frames, each of the chrominance signals is converted into a gradation signal having plural bits less or equal to a number of bits contained in each chrominance signal, while (b) in other frames of the plural frames, each of the chrominance signals is converted into a binary signal having 1 bit, so that an average of gradation levels of the respective chrominance signals in the plural frames after the conversion is substantially equal to gradation levels of the respective chrominance signals in a single frame before the conversion;

flag signal generation means for generating a flag signal for setting how the gradation signal and the binary signal are respectively assigned to each of the chrominance signals, which constitute each pixel signal, so that one of the chrominance signals has plural bits, while the other chrominance signals have 1 bit; and signal setting means for assigning the gradation signal and the binary signal respectively to each of the chrominance signals, in accordance with the flag signal, so that one of the plural chrominance signals, which constitute each pixel signal, has plural bits, while the other chrominance signals have 1 bit.

8. The digital video signal compression apparatus as set forth in claim 7, wherein said flag signal generation means generates the flag signal so that each adjacent plural pixel have the flag signal having a value different from each other.

9. A method of compressing a digital video signal, for reducing bits in number contained in the digital video signal in which a plurality of chrominance signals having plural bits per pixel are combined, comprising steps of:
   converting the respective chrominance signals of the digital video signal, in such a manner that every plural frames (a) in one frame of the plural frames, each of the chrominance signals is converted into a gradation signal having plural bits less or equal to a number of bits contained in each chrominance signal, while (b) in other frames of the plural frames, each of the chrominance signals is converted into a binary signal having 1 bit, so that an average of gradation levels of the respective chrominance signals in the plural frames after the conversion is substantially equal to gradation levels of the respective chrominance signals in a single frame before the conversion;

generating a flag signal for setting how the gradation signal and the binary signal are respectively assigned to each of the chrominance signals, which constitute each pixel signal, so that one of the chrominance signals has plural bits, while the other chrominance signals have 1 bit; and assigning the gradation signal and the binary signal respectively to each of the chrominance signals, in accordance with the flag signal, so that one of the plural chrominance signals, which constitute each pixel signal, has plural bits, while the other chrominance signals have 1 bit.

* * * * *